United States Patent [19]

Hillyard

[11] Patent Number: 4,573,251
[45] Date of Patent: Mar. 4, 1986

[54] APPLYING AN ELASTIC SLEEVE OVER AN ELONGATE BODY

[75] Inventor: Colin D. Hillyard, Southampton, England

[73] Assignee: Pirelli General plc, London, England

[21] Appl. No.: 698,311

[22] Filed: Feb. 5, 1985

[30] Foreign Application Priority Data

Feb. 24, 1984 [GB] United Kingdom ............... 8404869
Jul. 12, 1984 [GB] United Kingdom ............... 8417786

[51] Int. Cl.⁴ ............................................. B23P 11/02
[52] U.S. Cl. ........................................ 29/450; 29/235; 29/458
[58] Field of Search ................... 29/450, 235, 458, 234

[56] References Cited

U.S. PATENT DOCUMENTS

| | | | |
|---|---|---|---|
| 2,046,191 | 6/1936 | Smith | 29/450 X |
| 2,366,359 | 1/1945 | Searle | 29/450 |
| 2,645,004 | 7/1953 | Dorner | 29/450 |
| 2,721,601 | 10/1955 | Spencer | 29/450 UX |
| 3,126,624 | 3/1964 | Mirsky et al. | 29/450 |
| 3,138,859 | 6/1964 | Edwards | 29/450 |
| 4,054,743 | 10/1977 | Mayer et al. | 29/235 X |
| 4,417,394 | 11/1983 | Moody et al. | 29/450 X |

FOREIGN PATENT DOCUMENTS

| | | |
|---|---|---|
| 772059 | 4/1957 | United Kingdom . |
| 789969 | 1/1958 | United Kingdom . |
| 866265 | 4/1961 | United Kingdom . |
| 921629 | 3/1963 | United Kingdom . |
| 1469998 | 4/1977 | United Kingdom . |
| 2099638 | 8/1982 | United Kingdom . |

*Primary Examiner*—Charlie T. Moon
*Attorney, Agent, or Firm*—Brooks Haidt Haffner & Delahunty

[57] ABSTRACT

A tubular sleeve 12 is applied over an elongate body 10 which has a diameter greater than the inner diameter of the sleeve. An end portion 12a of the sleeve is engaged over an end portion of the body 10 to form a partial fluid-tight seal therewith. The opposite end portion of the sleeve is temporarily closed and fluid under pressure is introduced to the interior of the sleeve to inflate it sufficiently to enable it to be floated along the elongate body. Then the sleeve is displaced along the body. The fluid may be air introduced to the sleeve interior through a valve 14 which also temporarily closes the sleeve end.

9 Claims, 8 Drawing Figures

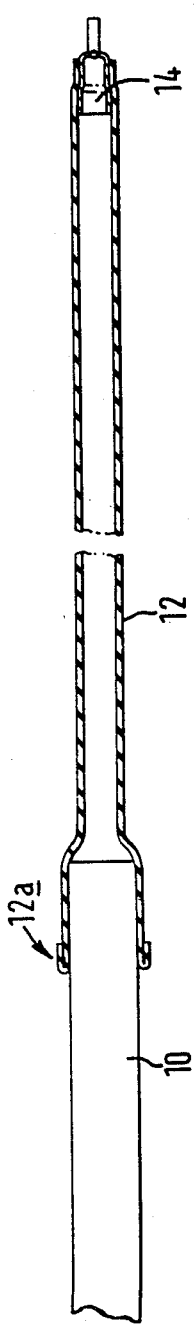
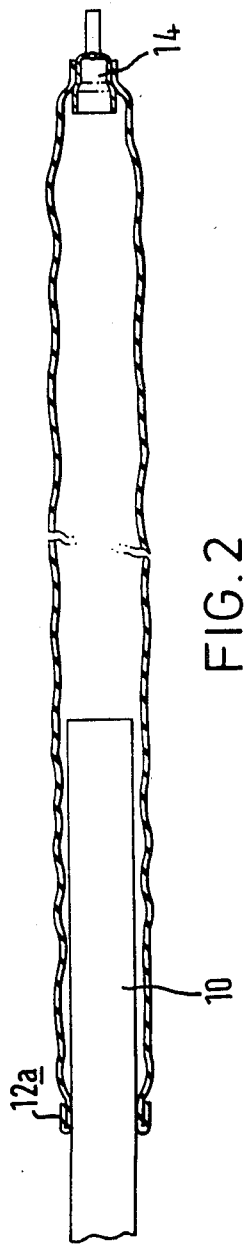

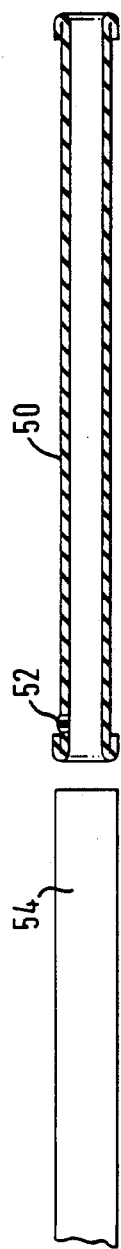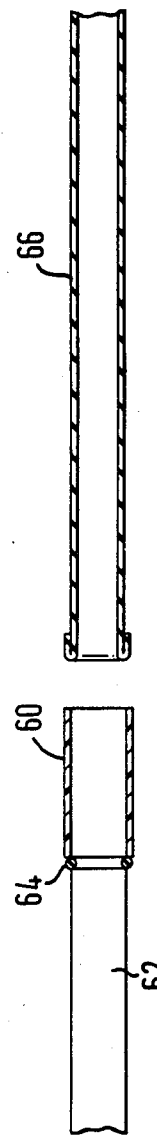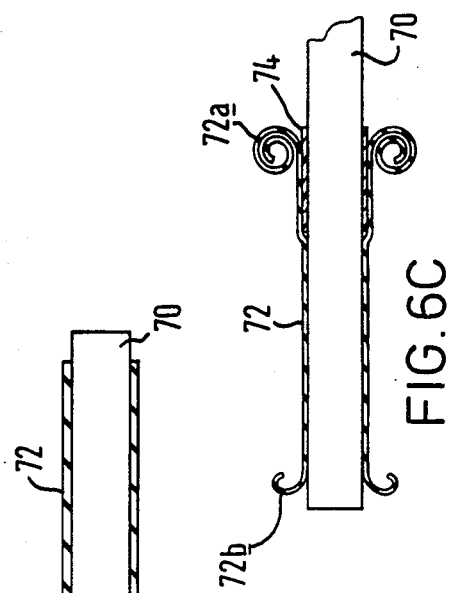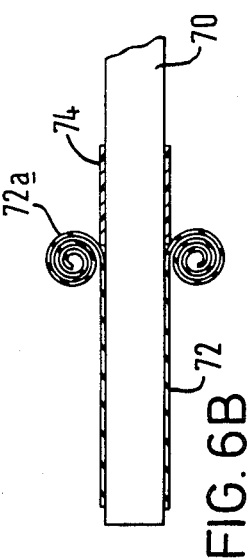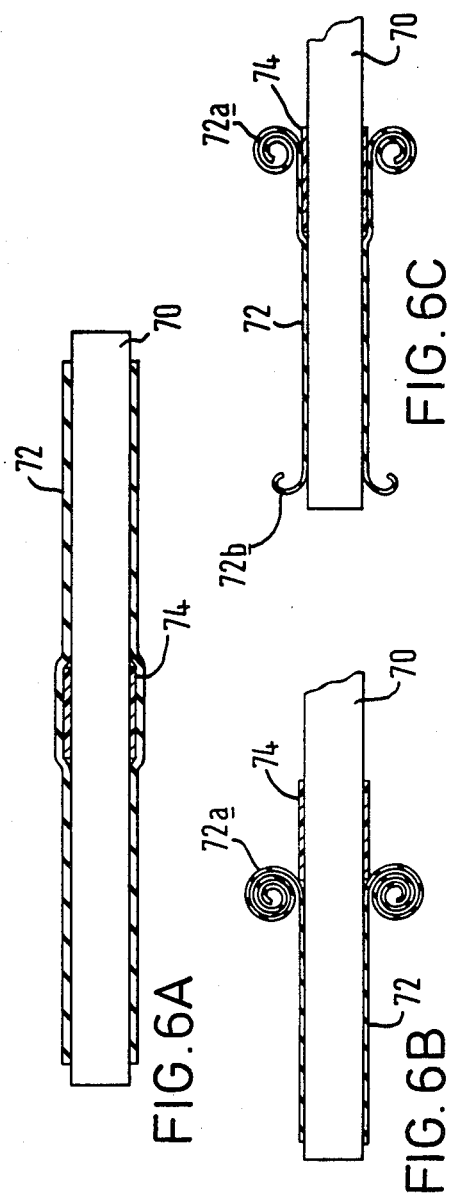
FIG. 4
FIG. 5
FIG. 6A
FIG. 6B
FIG. 6C

APPLYING AN ELASTIC SLEEVE OVER AN ELONGATE BODY

This invention relates to a method of applying an elastic sleeve over an elongate body, particularly for use in jointing or terminating electric cables.

Our United Kingdom patent application No. 81.17023 (Ser. No. 2 099 638A) discloses a method of jointing electric cables or terminating an electric cable, wherein the joint or termination insulation comprises one or more insulating layers each consisting of a preformed tubular sleeve of elastic insulating material fitted over the cable joint or cable end respectively. In that method, the preformed tubular sleeve is first rolled upon itself, then fitted over one of the cables (or the one cable) and finally unrolled to cover the required zone of the joint or termination: the sleeve may first be rolled onto a tubular carrier to facilitate fitting over the cable.

Our United Kingdom patent application No. 83.20822 discloses a method of rolling up a tubular elastomeric sleeve ready for fitting to an electric cable for jointing or terminating that cable, wherein an elongate member is inserted into the tubular sleeve, the elongate member being of smaller diameter or cross-sectional size than the internal diameter of the sleeve, and then the sleeve is progressively rolled upon itself starting from one end, the arrangement being such that the rolled up portion of the sleeve grips the elongate member whilst the remainder portion of the sleeve is free to slide along that elongate member. In practice, it is found that the unrolled portion of the sleeve slides progressively in the direction of rolling but, because it is free to slide in this manner, it is relieved of stresses which might otherwise serve to resist its rolling and indeed relatively little force is required to effect the rolling. A relatively rigid tubular carrier, having a diameter greater than the inner diameter of the tubular insulating sleeve, may be disposed within that sleeve, for example mid-way along the sleeve, prior to the rolling process. The tubular sleeve may then be rolled from one of its ends and onto one end of the carrier, and then rolled from its other end and onto the other end of the carrier.

We have now devised a simple and efficient procedure for applying a tubular sleeve of elastic material over an elongate body which has a diameter or cross-sectional size greater than the inner diameter of the sleeve.

In accordance with this invention, there is provided a method of applying a tubular sleeve of elastic material over an elongate body which has a diameter or cross-sectional size greater than the inner diameter of the sleeve, comprising engaging an end portion of the sleeve over an end portion of the elongate body, temporarily closing the opposite end of the sleeve and introducing fluid under pressure to the interior of the sleeve to inflate it sufficiently to be floated along the elongate member, and then displacing the sleeve along the elongate body. Said end portion of the sleeve forms a partial fluid-tight seal with the elongate body which it embraces and the sleeve when inflated is freely displaceable along the elongate body, the fluid (which conveniently may be air) escaping through this partial seal.

This method may have a number of uses, including for example applying a tubulr sleeve over a tubular carrier (as described above) such that the carrier becomes disposed for example mid-way along the length of the sleeve, whereafter the sleeve may be rolled onto the carrier as described above. Other uses would be to place a sleeve over an elongate member such as an electric cable e.g. to rebuild the insulation at a joint or termination, to cover a repair, to cover a termination with a protective sleeve, to cover a joint with a protective sleeve, to position a sleeve on a mandrel, or to position a sleeve on a member for the purpose of providing corrosion protection.

In certain cable terminations (for example on multi-core power cables), a relatively long sleeve is required to cover the exposed length of cable core, typically 700 mm. approximately but sometimes up to 1200 mm. or more. It is difficult or impossible to roll up a sleeve of this length. Also, we have found that for cable terminations, as compared with cable joints, a material of relatively high tear strength is required for the sleeve in order that it is sufficiently robust to withstand handling on site: sleeves of this higher tear strength are particularly difficult to roll onto a tubular carrier, even when the sleeves are short in length. Thus the method in accordance with this invention is particularly suited to the application of sleeves to cable terminations. The cables may be paper insulated or elastomeric insulated, may be single-core or multi-core (typically 3-core), and the terminations may be indoors (for example connecting cables to transformers or switchgear boxes and bus bars in indoor substations) or outdoors (for example connecting cables to an overhead line or substation bus bars). In general, the cables may be intended for voltages in the range 6.6 to 36 KV for example and perhaps up to 66 KV for single-core elastomeric insulated cables.

When jointing electric cables, and by using the method in accordance with this invention, a sleeve may be applied to one cable and floated along that cable until clear of the jointing zone, then the cables can be joined (involving mechanically and electrically interconnecting their conductors) and thereafter the sleeve can be floated back along the cables until it is positioned over the jointing zone. In order to carry out these steps, the sleeve is preferably inflateld through its side wall, rather than through its extreme end, so that the valve arrangement does not prevent the trailing end of the sleeve initially floating onto and therafter floating along the cables.

When it is desired to provide a sleeve rolled onto a tubular carrier as described above, it may be desirable to float the sleeve onto an elongate member of greater cross-section than the inner diameter of the sleeve (by the method in accordance with this invention), and then to roll the sleeve up from one of its ends, or from its opposite ends. The tubular carrier may be placed around the elongate member initially, so that the sleeve is floated over the elongate member and over the carrier so that the sleeve can next be rolled (either from one of its ends or both of its ends) onto the carrier. Instead, the sleeve may be floated onto the elongate member then rolled up from one end, whereafter the carrier is slid along the elongate member from the same end to abut the roll of sleeve. The sleeve is then slightly unrolled, so that its rolled portion rides onto the carrier, and the sleeve can then be rolled up from its opposite end until the thus-formed second roll also rides up onto the carrier, which can now be slid off the elongate member. These procedures are appropriate if the carrier is relatively large in outer diameter, such that difficulty would be experienced in making the roll of sleeve ride onto the carrier from the elongate member if the latter were smaller in diameter than the inside of the sleeve and thereby present a substantial difference in diameter between the elongate member and the outer surface of the carrier. Despite the fact that the sleeve tightly embraces the elongate member, it is found that the sleeve can be rolled up quite easily: this is because, when the sleeve is inflated, then floated along the elongate member and finally alllowed to deflate, it is found to have been stretched in length (the friction between the dry or unlubricated surfaces of the sleeve and elongate member preventing the sleeve restoring to its natural length); the rolling process is then aided by the stresses, due to stretching, which are stored in the sleeve.

By contrast, when applying a sleeve to a cable joint or termination using the inflation and floating techniques described above, an appropriate lubricant is preferably applied between the sleeve and the underlying cable, so that after the sleeve is deflated it is able to restore to its natural length, avoiding a condition that longitudinal stresses will remain within the sleeve in the completed joint or termination.

Embodiments of this invention will now be described, by way of examples only, with reference to the accompanying drawing, in which:

FIG. 1 is a diagrammatic longitudinal section through an elongate body and a tubular sleeve which is to be applied to that elongate body, the sleeve at this stage having one end embraced around a free end of the elongate body and ready to be inflated and floated onto the elongate body;

FIG. 2 is a similar view at a later stage in the procedure for applying the sleeve over the elongate body, the sleeve having been inflated and displaced for part of its length along the elongate body;

FIG. 4 is a diagrammatic longitudinal section through a tubular sleeve being applied to a cable as a preliminary step in jointing that cable to another cable;

FIG. 5 is a diagrammatic longitudinal section through a tubular sleeve being applied over a short tubular carrier;

FIG. 6a is a diagrammatic longitudinal section through a sleeve applied over an elongate member having a tubular carrier pre-positioned around it;

FIG. 6b is a similar view of a sleeve applied over the elongate member alone and rolled up from one end and then with a tubular carrier slid along the elongate member; and FIG. 6c shows stages, subsequent to that shown in FIG. 6b, of rolling the sleeve onto the carrier.

Figure 3:
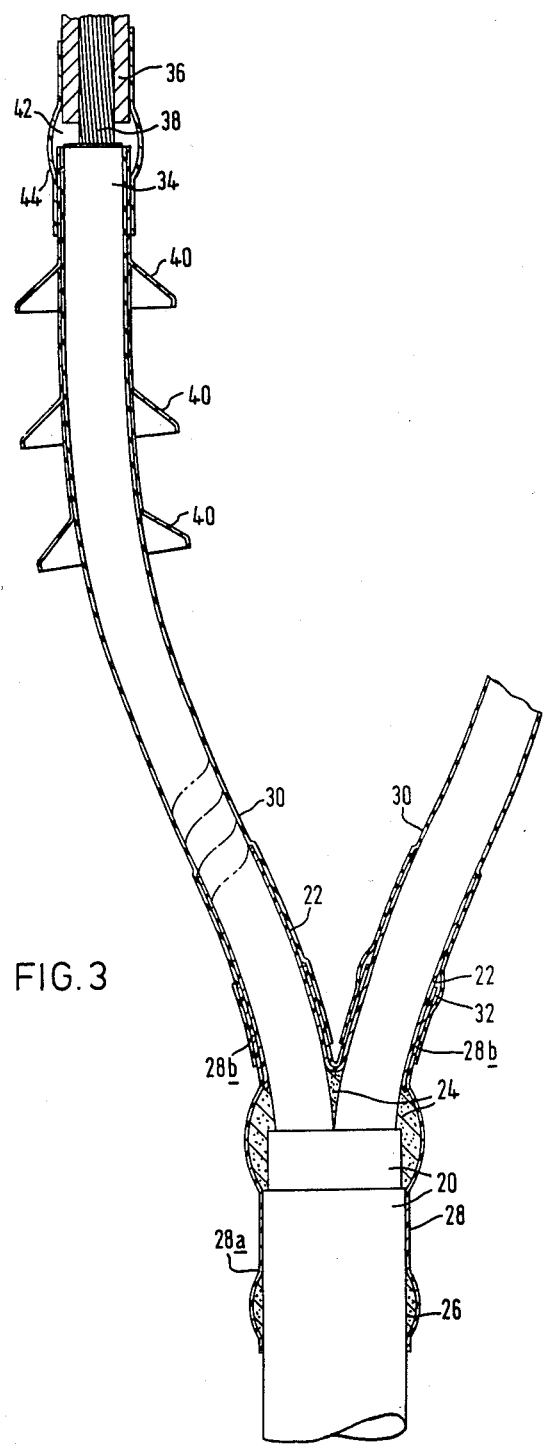
FIG. 3 is a schematic view of one example of cable termination, to which sleeves have been applied by the method illustrated in FIGS. 1 and 2.

Referring to FIG. 1, an elongate body 10, which may be circular or of any other cross-sectional shape, is to receive a tubular sleeve 12 of elastic material, the sleeve 12 having an inner diameter or cross-sectional size smaller than the outer diameter or cross-sectional size of the elongate body so that the sleeve resiliently embraces the elongate body. In carrying out the method of applying the sleeve 12 to the body 10, one end of the sleeve is stretched over a free end of the body 10 as shown. The extreme end portion of the sleeve may be turned back on itself as shown at 12a to ensure that this end of the sleeve will form a partial air-tight seal with the body when the sleeve is inflated: instead or in addition, an appropriate elastic band or clip or other elastic means may be fitted around the end of the sleeve to ensure the partial air-tight seal, whilst in other circumstances the partial air-tight seal may be formed without the need for such elastic means and without the need to fold the end portion of the sleeve back on itself.

The other end of the sleeve 12 is closed by stretching it over an adaptor 14 which incorporates a non-return valve, for example a schraeder valve. A pump is attachable to this valve and is used to inflate the sleeve 12 sufficiently to allow it to be floated over the body 10, as shown in FIG. 2. Thus the sleeve 12 is inflated to a cross-sectional size preferably equal to or greater than that of the elongate body 10, so that little force is needed to displace the sleeve along the body: at the same time, air is expelled from within the sleeve, passing through the partial air-tight seal formed between the end of the sleeve and the body itself. The sleeve may be displaced along the body as far as required, or until the adaptor 14 abuts the free end of the elongate body with just a short length of the sleeve projecting from the elongate body.

FIG. 3 shows an example of cable termination in which insulating sleeves have been applied using the method described with reference to FIGS. 1 and 2. In this example, the cable is a 3-core cable and terminates in a generally upright position as shown. A considerable length of the 3 cores (only 2 of which can be seen) have been stripped of outer insulating layers 20 of the cable and the cores (which are sectoral in cross-section) have been spread apart as shown. Adjacent their lower ends, the exposed cores each receive a short tube 22 of partially conductive elastomeric material, which tubes provide for stress control. An appropriate compound is applied at 24 to seal the cut-back ends of the cable insulating layers 20, and further such compound is applied as a ring around the cable at 26: an elastomeric glove 28 is applied over this region, the glove having one tubular end portion 28a embracing the cable immediately below the stripped cores, and at its other end 3 tubular portions e.g. 28b, 28b which embrace the respective cores as shown.

Along each of the cores, there is applied an elastic insulating sleeve 30 of considerable length, and this is applied using the method illustrated by FIGS. 1 and 2. At its lower end, each sleeve 30 embraces the end of the tubular portion 28b of the glove 28, around which also further insulating compound may optionally be applied, as shown at 32. In the example shown, each sleeve 30 is cut-back (after being floated onto its core) level with the cut-back end of the core insulation 34. Instead, the sleeve 30 may be cut-back lower down the core and a further short insulating sleeve applied (as by rolling on) to cover the end portion of the main sleeve 30, the end portion of the core insulation 34 and also a portion of a metal connector 36 which receives the cable conductor 38.

In the example shown, the termination is outdoors and a series of so-called sheds 40 are slipped onto each core over the sleeve 30. Each shed is formed of elastomeric insulating material and comprises a tubular upper portion and a conical lower portion: the sheds serve to extend the creepage path along the length of the core to reduce electrical leakage currents. Finally, in the example shown, insulating compound is applied at 42 around the exposed cable conductor and the adjacent portions of the uppermost shed and of the connector 36 and over these a short sleeve 44 is applied.

FIG. 4 shows the arrangements for forming a cable joint. A sleeve 50, folded back on itself at both ends is provided with a valve arrangement 52 in its side wall, adjacent one end. This valve arrangement may, as shown, comprise a relatively flat or button-shaped fitment sealed into the sleeve wall and provided with means, such as a metal screw thread, for coupling to a valved nozzle of an air line (not shown). When this coupling is made, the sleeve can be inflated once its leading end is embraced over the cable end 54 and its trailing is temporarily closed, e.g. by being folded over manually. The inflated sleeve can then be floated along the cable until its trailing end, still held folded over, reaches the cable end: then if the folded end is released quickly whilst the sleeve is still being displaced longitudinally, its advance will continue until the trailing end of the sleeve has advanced onto the cable and formed a partial seal therearound. The sleeve can then be floated along the cable as far as desired to enable the cable end to be stripped of its insulation and joined to another cable, whereafter the sleeve is floated back into position over the jointing zone. The valve arrangement 52 will be remote from the more highly stressed (electrically) regions of the joint, so that it can be left: alternatively the end portion of the sleeve, including this valve arrangement, can be cut away. The valve arrangement is flat so that, if left, it will not protrude and prevent other insulating layers being applied.

The joint sleeve may comprise several layers i.e. two or more tubes one around another, all applied as one sleeve as just described. The tubes may be variously of insulating or semi-conducting material as required. Alternatively, several sleeves may be built up one over another over the jointing zone, using a plurality of sleeves applied separately: for example each of the two cables to be joined may have one or more sleeves floated onto and along it to a convenient "parking position", whereafter the cables are joined and the sleeves one-by-one floated back into position, one over another, over the jointing zone. Again, the different sleeves may be variously of insulating or semi-conducting material as required.

As previously mentioned, in the case of the termination (FIG. 3) or the joint (FIG. 4) lubricant is preferably applied between the sleeve and underlying cable, so that after the sleeve is deflated it is able to restore to its natural length, avoiding a condition that longitudinal stresses will remain within the sleeve in the complicated joint or termination.

The method in accordance with this invention is not limited as to the length of the sleeve which can be applied. The method has been described assuming that the elongate body, which is to receive the sleeve, is solid and will thus close the leading end of the sleeve, but the elongate body may itself be tubular, in which case its opposite end must be sealed, for example temporarily. For example, and referring to FIG. 5, if the sleeve is to be applied over a short tubular carrier 60 as previously described, the carrier to become disposed perhaps midway along the sleeve, then the other end of the carrier may be closed by urging against it a relatively small diameter rod 62 provided at its end with a sealing gasket 64 which engages around the inner rim of that other end of the carrier: the sleeve 66 can then be floated over the carrier and over the rod to its required position. The rod can then be withdrawn and the sleeve can be rolled up onto the carrier as described in our previously-mentioned application No. 83.20822.

FIG. 6 illustrates use of the method in accordance with this invention for providing a tubular sleeve rolled up onto a tubular carrier, wherein the sleeve 72 is floated onto an elongate member 70 of greater diameter than the inner diameter of the sleeve, and then rolled (e.g. from its opposite ends) along the member 70 and finally up onto the carrier 74. It can be arranged that there is relatively little difference between the outer diameter of the member 70 and the outer diameter of the carrier, so that only relatively little effort is required to roll the sleeve from the member 70 and up onto the carrier. Despite the fact that the sleeve tightly embraces the member 70, it is found that the sleeve can be rolled up quite easily: this is because, when the sleeve is inflated, then floated along member 70 and finally allowed to deflate, it is found to have been stretched in length (the friction between the dry or unlubricated surfaces of the sleeve and member 70 preventing the sleeve restoring to its natural length); the rolling process is then aided by the stresses, due to stretching, which are stored in the sleeve. As shown in FIG. 6a, sleeve 72 may be floated over both the member 70 and the carrier 74 (pre-positioned perhaps half-way along the member 70), and then the sleeve can be rolled up from its opposite ends and onto the carrier, which can then be removed form the member 70. Instead, as shown in FIG. 6b, the sleeve 72 may be floated onto member 70 alone, then the sleeve is rolled up form one end and next the carrier 74 is applied to the member 70 and slid along until it abuts the rolled portion 72a of the sleeve: next, as shown in FIG. 6c, the sleeve is partly unrolled, so that its rolled portion 72a rides onto the carrier 74, and finally the sleeve is rolled up from its opposite end until the thus-formed rolled portion 72b also rides onto the carrier.

The method in accordance with this invention enables a given diameter of sleeve to be applied to cable cores (or other elongate bodies) within a significant range of diameters or cross-sectional sizes. A very long length of sleeve may be applied whilst the method is simple and efficient to carry out whilst being low in cost. The method moreover enables the use of materials of the higher tear strength, as mentioned above. In those cases which avoid the sleeves being rolled onto carriers in the factory and stored for some time in this rolled-up condition, the method avoids the possibility (which may arise for some elastomeric materials) that the electrical and/or elastic properties of the sleeve may slowly deteriorate owing to it being maintained under stress.

I claim:

1. A method of applying a tubular sleeve of elastic material over an elongate body which has a diameter or cross-sectional size greater than the inner diameter of the sleeve, comprising turning each end portion of the sleeve back on itself, engaging one turned back end portion of the sleeve over an end portion of the elongate body to form a partial fluid-tight seal between said turned back sleeve end portion and said elongate body, temporarily closing the opposite end of the sleeve and introducing fluid under pressure to the interior of the sleeve through a relatively flat valve in its side wall to inflate the sleeve sufficiently to enable it to be floated along the elongate body, displacing the sleeve along the elongate body such that the other turned back end portion engages over said end portion of the elongate body to form a partial fluid tight seal between said other turned back sleeve end portion and said elongate body, and thereafter floating said sleeve along said elongate body to a desired position thereon.

2. A method of forming a cable joint including applying a tubular sleeve of elastic material over an end section of a first cable which end section has a diameter or cross-sectional size greater than the inner diameter of the sleeve, comprising turning each end portion of the sleeve back on itself, engaging one turned back end portion of the sleeve over an end portion of said cable end section to form a partial fluid-tight seal between said sleeve end portion and said cable end section, temporarily closing the opposite end of the sleeve and introducing fluid under pressure to the interior of the sleeve through a relatively flat valve in its side wall to inflate the sleeve sufficiently to enable it to be floated along said cable end section, displacing the sleeve along said cable end section such that the other turned back end portion engages over said end portion of the cable end section to form a partial fluid tight seal therewith, floating said sleeve along said cable end section to a desired position thereon axially spaced from the end portion of said cable end section, joining said cable end portion to an end portion of a second cable end section, and thereafter floating said sleeve over the jointing zone between said first and second cable end sections.

3. A method as claimed in claim 1 or 2, wherein said fluid is air.

4. A method as claimed in claim 1 or 2, wherein said opposite end of the sleeve is temporarily closed by folding that end over on itself.

5. A method as claimed in claim 1, wherein the elongate member is an electric cable.

6. A method as claimed in claim 5, wherein a lubricant is applied between the sleeve and the cable.

7. A method as claimed in claim 1, wherein a plurality of said tubular sleeves are applied over said elongate body simultaneously to provide a plurality of layers of elastic material thereon.

8. A method as claimed in claim 1, wherein a plurality of said tubular sleeves are applied separately over said elongate body to provide a plurality of layers of elastic material thereon.

9. A method as claimed in claim 1, wherein said elongate member comprises an electric cable joint or termination.

* * * * *